May 30, 1967    SEIUEMON INABA ETAL    3,323,030
DIGITAL FINE AND COARSE SERVO MOTOR CONTROL SYSTEM
Filed Dec. 23, 1963    3 Sheets-Sheet 1

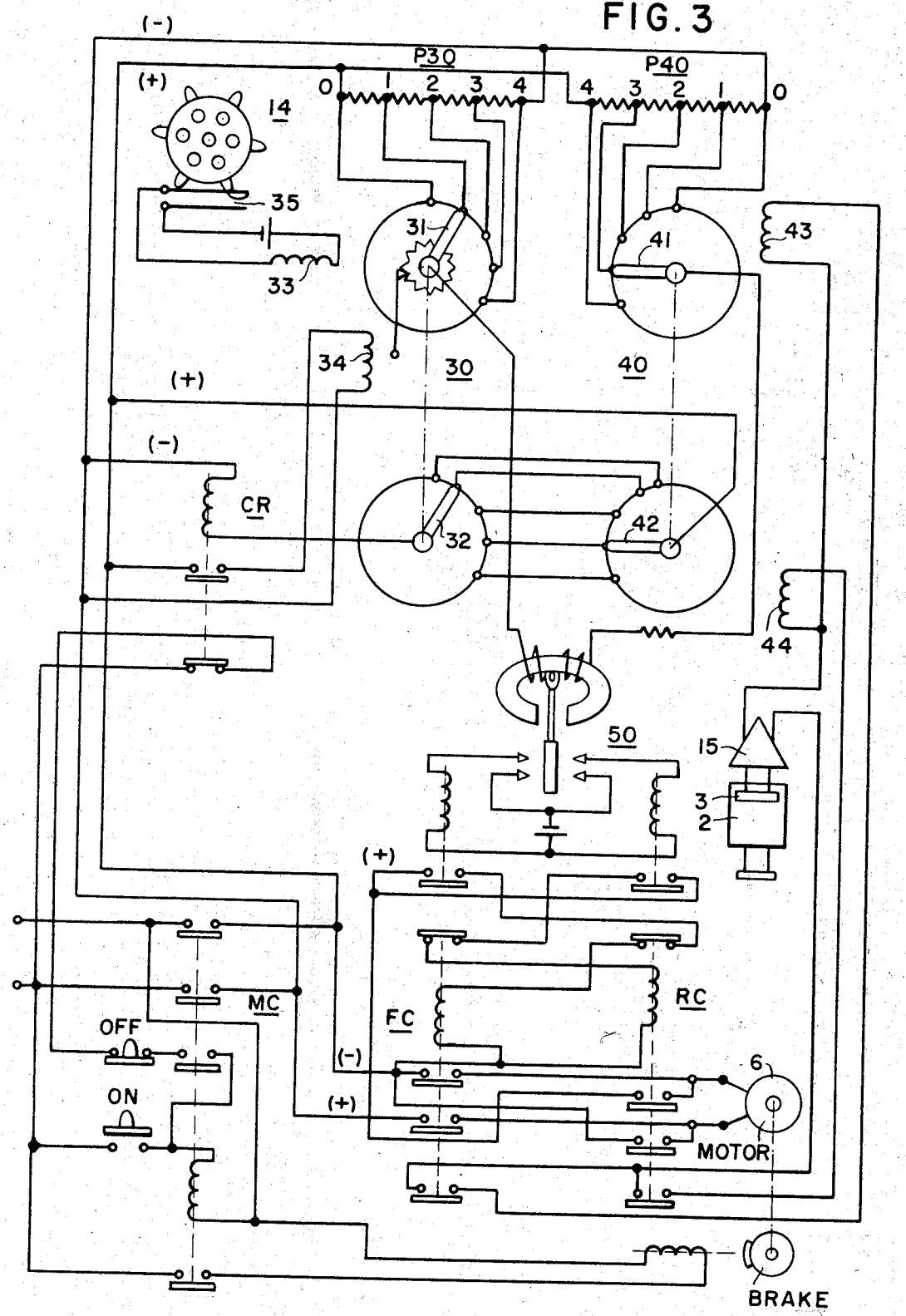

United States Patent Office
3,323,030
Patented May 30, 1967

3,323,030
DIGITAL FINE AND COARSE SERVO MOTOR CONTROL SYSTEM
Seiuemon Inaba and Kanryo Shimizu, Kawasaki, Tokiji Shimajiri, Mitaka-shi, and Hajime Mori, Ota-ku, Japan, assignors to Fujitsu Limited, Kawasaki, Japan, a corporation of Japan
Filed Dec. 23, 1963, Ser. No. 332,978
7 Claims. (Cl. 318—18)

Our invention relates to systems for automatically controlling the position of a structure movable along a given path, such as the work or tool support in lathes, boring mills, milling machines or other fabricating machinery.

It is an object of our invention to devise a positional control system that affords an extremely precise control generally comparable to vernier action in accordance with a selectively preset datum value. A more specific object is to achieve such a precise vernier control with the aid of a numerical pulse control system.

Another object of our invention is to devise a system of the above-mentioned kind which affords a rapid change in position of a machine-tool structure or component of other fabricating machinery so that, when a large change in position is desired, the major portion thereof is carried out at high speed and the residual portion is completed at low speed to secure high accuracy of final positioning.

Still another object of our invention, in conjunction with those mentioned above, is to afford a precise automatic positioning by relatively simple mechanical means that minimize or avoid backlash trouble as often encountered with known positioning equipment; and it is also an object to devise a positional control system for the accurate setting of a displaceable structure in accordance with a preset datum value, that permits being subsequently added with relative ease to already existing machinery.

A further object of our invention is to make a system of the above-mentioned type applicable with any kind of available data input devices of the pulse-issuing types, such as dial panels, punched tape, punched cards, stencils for magnetic tape.

Yet another object of the invention is to make the structure in such a system move successively to a number of positions in response to a number of successive input values without incurring errors at each new input due to previously entered inputs. More specifically it is an object of the invention to provide compensating means which avoid errors due to successive data-value inputs.

According to a feature of our invention means for detecting the actual position of the structure are displaced from their null position by an amount equal to the vernier or fine portion of the datum-value input and the structure is moved to a position where the detecting means corresponds to the coarse portion of the input data, whereby the structure is set to the total desired location.

Preferably according to the invention the detecting means comprise an optical detector cooperative with an optical scale having graduations corresponding in size (for example 1 mm.) to the value of a unit input digit, the detector being displaceably mounted on either the movable structure member or the bed member on which it moves and the scale being mounted on the other of these members. The detector emits pulses each time it passes a scale graduation, which pulses are counted in a control loop and compared with the input data so as to reduce signals for moving or stopping the movable structure. The detector is displaced relative to its mount by a second control loop which compares its position to the vernier or fine input data.

According to another feature of the invention compensating means responding to the relative value previously entered to set the movable structure at its actual location and the new values, correct any errors caused by changes in the input.

These and other features of the invention are set forth in the claims forming a part of this specification. Other objects and advantages of the invention will become obvious from the following detailed description when read in light of the accompanying drawings. However it will be obvious to those skilled in the art that the invention may be practiced otherwise than as shown. In the drawings FIG. 1 is a block diagram of a system embodying features of the invention;

FIG. 3 is a schematic circuit diagram showing in detail several blocks of FIG. 1.

Figure 1:
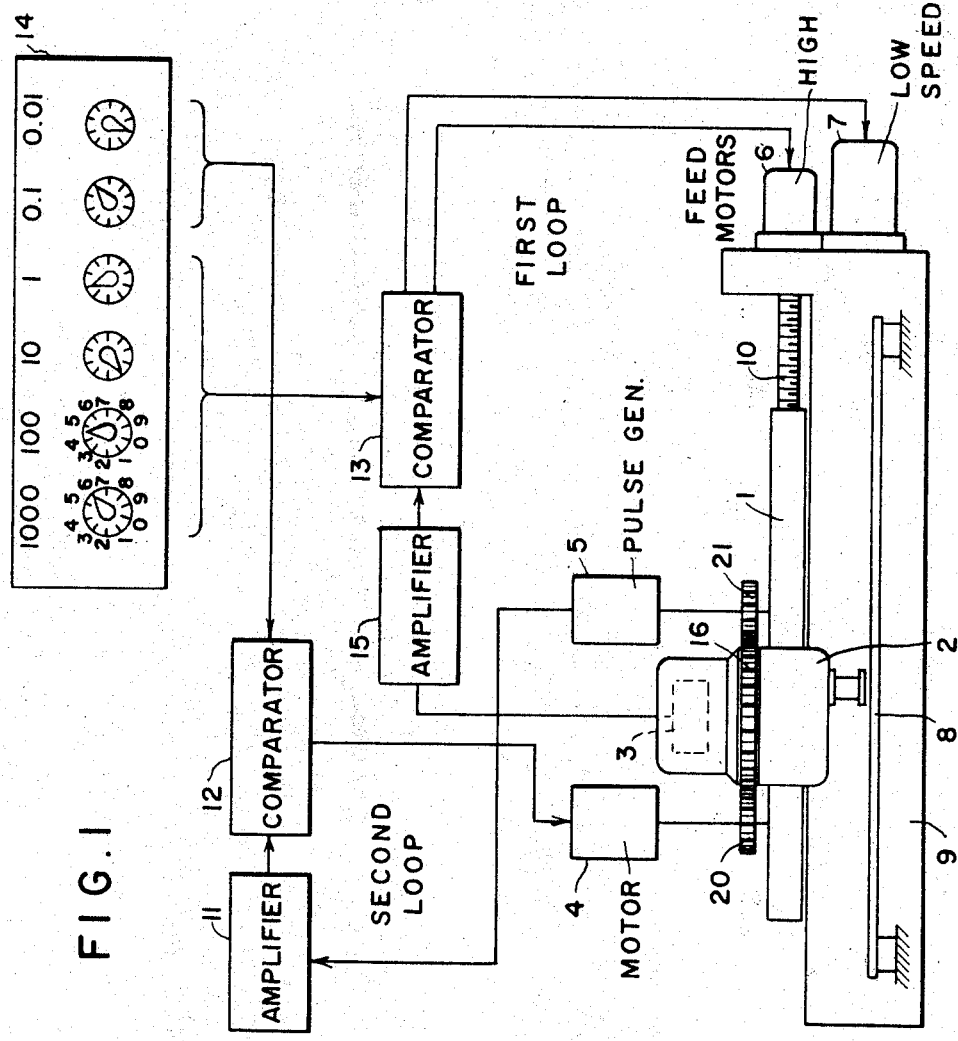

In FIG. 1, a machine table 1 or other structure to be controlled, of a lathe, bore-drilling machine, or other fabricating device, is movably mounted on a bed 9. Two drive motors 6 and 7 control lateral movement of the table 1 by a feed screw 10 on the basis of voltages supplied by the output of a comparator 13. Motors 6 and 7 may be replaced by a device including a combination of a single drive motor, a speed reduction device, and a clutch mechanism.

An optical detecting head 2 is fixed on the movable table 1, and forms an optical system with a calibrated standard scale 8 having 1 mm. optical graduations and fixed to the bed 9. Detecting head 2 possesses a photoelectric transducer 3 having a photoelectric element such as a photodiode or a photocell, to detect optically the individual graduations on the standard scale 8 as the table 1 moves the head 2 past the graduations. The resulting electric pulse signals are fed to the comparator 13 through an amplifier 15.

Figure 2:
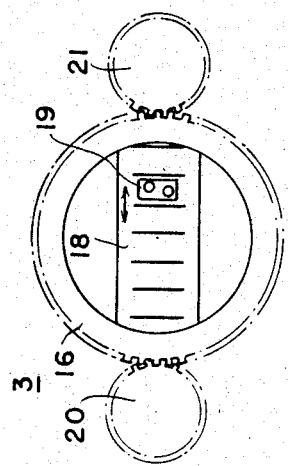
FIG. 2 is a bottom view of the detecting device in FIG. 1.

FIG. 2 shows the interior of the photoelectric transducer 3, as seen from below the head 2. The photoelectric element 19 is shown offset from the center of head 2 and an image 18 of the scale 8 is magnified and projected upon the element 19 by a lens in head 2. Each time the detecting head 2 travels with the table 1 so that an image of the graduation on the scale 8 passes the position of the photoelectric element 19, one pulse is emitted by the photoelectric element 19.

A gear 16 surrounding the detecting head 2, upon rotation, changes the lateral position of the photoelectric element 19 in the direction shown by the arrow. The gear 16 engages a gear 20 (FIG. 1) connected to the servo motor 4 constituting a second servo element, as well as a gear 21 which is connected to the pulse generator 5 so as to produce a pulse for each angular incremental movement of the gear 21. Thus the position of the photoelectric element 19 may be displaced by the servo-motor 4 an amount which is sensed by the pulse generator 5 to produce electric pulses in response thereto. The output of the comparator 12 controls the servo-motor 4, and hence the gear 16, the element 19 and the gear 21. This produces output pulses at the pulse generator 5 which will be fed back to the comparator 12 through the amplifier 11.

Position input in millimeters is entered in the decimal dial panel 14 having 6 dials representing four integer digits and two decimal fraction digits of the input value.

In FIG. 1, the first loop for controlling the table 1 responds to the above four integer digits of the dial panel 14. It includes the comparator 13 for comparing the value in dial 14 to the position of head 2 and producing an output value, two drive motors 6 and 7 which constitute the first servo element responsive to the output of comparator 13 for moving table 1, an optical detecting head 2 coacting with scale 8 in response to movement of table 1 for producing pulses for each 1 mm. movement of table 1, and amplifier 15 for feeding the position of head 2 to comparator 13.

The second loop for presetting the optical detector head 2 in response to the fractional digits of panel 14, includes the comparator 12 responding to the decimal digits in panel 14 and the position of element 19, drive motor 4 for displacing element 19 in response to comparator 12, detector 2, pulse generator 5 for responding to the position of element 19, and amplifier 11 for feeding comparator 12. Drive motors 6 and 7 move the table 1 at low and high speed respectively.

The scale 8 is graduated so that the spaces between adjacent lines indicate 1 mm. Preset counters are included in each of the comparators 12, 13.

In operation assume that the table is at position 0, and that the scale line 0 is omitted from the scale 8 or is undetectable by the head 2. The value 2389.63 is set into the dial 14 so as to move table 1 to the position 2389.63 mm. The first four digits of this input value, namely 2389, are entered into the comparator 13, while the two decimal fraction digits 0.63 are entered into the comparator 12. When the input value .63 is entered into the comparator 12, drive motor 4 receives the output of the comparator 12 and displaces the photoelectric element 19 toward a position corresponding to −.63 mm. off center of head 2 by means of the gears 20 and 16. The amount of displacement is detected through the gears 16, 21, and converted into electric pulses by the pulse generator 5 which feeds back to the comparator 12 through amplifier 11.

When the new position corresponds to the decimal digits 0.63 of the input, the value indicated by the pulse feedback from the pulse generator 5 will be equal to that supplied by the dial panel 14. Thus comparator 12 will have a zero output and stop the motion of drive motor 4 to complete the preset of photoelectric element 19. Then the high speed drive motor 7 is driven by the output of the comparator 13, to move the table 1 toward the desired position by means of feed screw 10. Depending on the movement of table 1, the photoelectric element 19 emits a pulse each time it crosses the image 18 of a scale line (1 mm. apart). The amplifier 15 passes the pulses to the comparator 13. If the difference between the table 1 position, indicated by the feedback pulses and the four digit input, indicated by the dial panel 14, reaches a low difference value, for example 0005.0 the comparator 13 changes the feed motor of the table 1 from 7 to 6, so as to drive the table 1 at a lower speed. When the difference is zero, that is the element 19 senses the scale line 2389, the motor 6 stops the motion of the table 1. Since the photoelectric element 19 has already been preset so that the table 1 is a distance .63 ahead of the element 19, the table 1 resets at the scale value 2389.63.

This invention avoids backlash and provides a simple control circuit. The standard scale coacting with the detecting head 2 may be easily installed on any kind of equipment to obtain a high degree of precision with a simple inexpensive device.

The comparators 12 and 13 may be either digital or analog devices and their respective inputs may be adapted to convert the values as necessary.

FIG. 3 illustrates a portion of the details of the control system of FIG. 1 for explaining its operation although it will be obvious that these details in FIG. 1 may be constructed otherwise. For simplicity, the dial panel 14 is represented in FIG. 3 only by a single dial. Furthermore, only one of the two control loops, namely the first loop for controlling a single feed motor 6 is shown. It will be obvious that an analogous system can control the servomotor 4 in FIG. 1.

The comparator 13 (FIG. 1) is shown in FIG. 3 to comprise two stepping switches 30 and 40. The stepping switch 30 has two movable contact arms 31, 32, a stepping magnet 33 and a release magnet 34. The release magnet, when excited, returns the switch arms to zero position. Stepping magnet 33 receives pulses from dial switch 35.

The stepping switch 40 is reversible. It has two movable contact arms 41, 42, a forward stepping magnet 43 and a stepping magnet 44 which moves the switch arms in the reverse direction.

A polarized magnet 50 is connected through arms 31 and 41 to a bridge network of two potentiometers P30 and P40.

Assume that stepping switch 30 is in zero position. When the dial 14 is operated to select number 2, the switch 35 issues two pulses and the switch arm 31 moves to the position 2 as illustrated. Now the ON button is to be closed. This closes a main contactor MC which applies voltage to the potentiometers P30, P40 and also releases the brake of motor 6. Since the contact arms 41, 42 of stepping switch 40 are in position 3, the bridge network is unbalanced and the polarized relay 50 energizes one of the two contactors FC, RC. The contactor then closes the circuit for motor 6 which operates the feed screw 10 (FIG. 1) and displaces the machine structure 1 to the desired position. During the displacement the detector 2 issues pulses through the amplifier 15 to one of the two stepping magnets 43, 44 so that the stepping switch 40 is moved from position 3 to position 2.

When the position 2 is reached by arms 41, 42 in stepping switch 40, a control relay CR is energized through arms 32 and 42 and opens the self-holding circuit of main contactor MC. As a result, the motor 6 is disconnected and the brake is set, thus stopping the motor in the correct position. At the same time, the relay CR energizes the release coil 34 so that the arms 31, 32 of stepping switch 30 are returned to zero.

The system is then ready for renewed operation of the dial 14.

Figure 4:
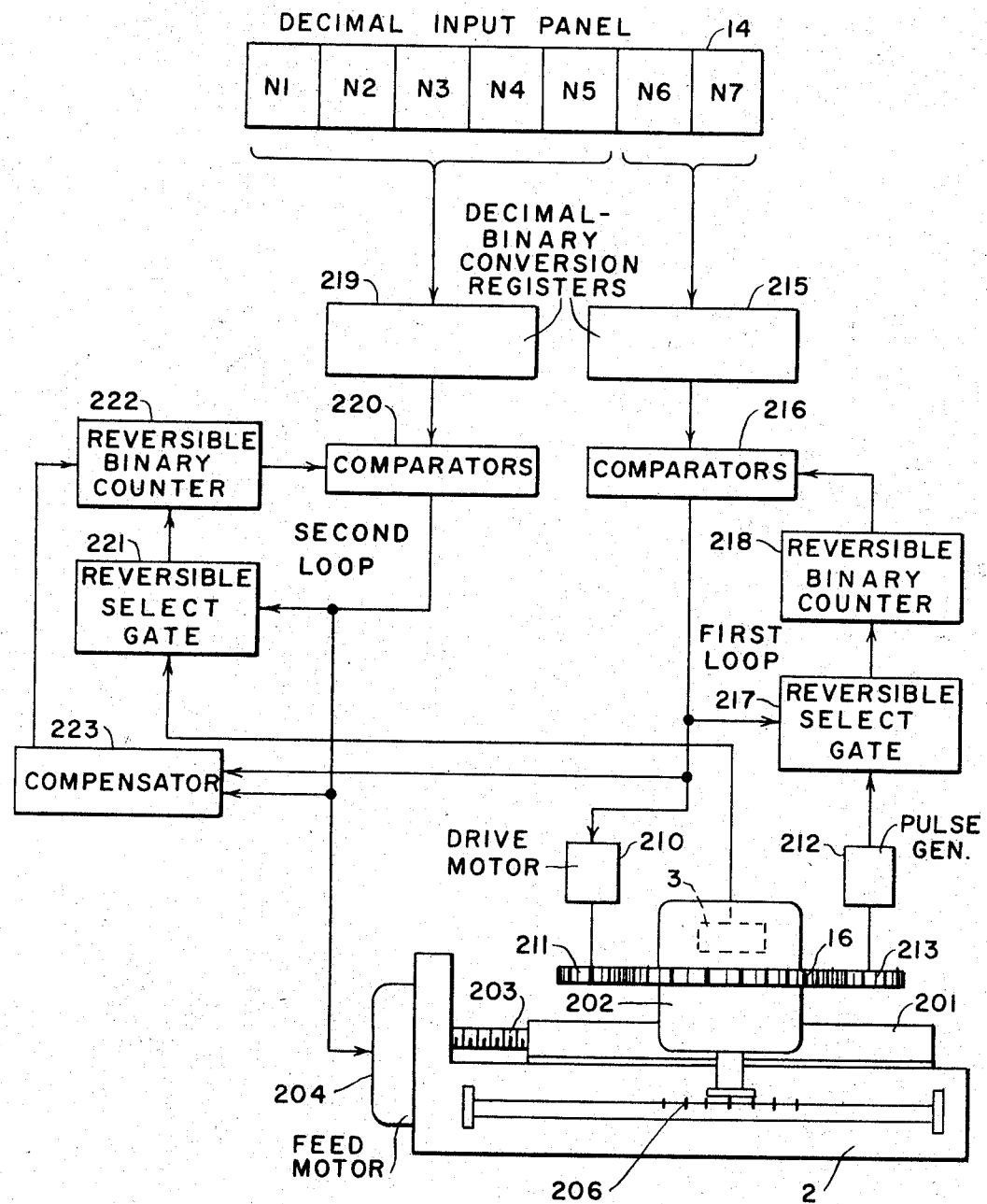
FIG. 4 is a block diagram of another system embodying features of the invention.

FIG. 4 illustrates another embodiment of this invention. Here a movable table or apron 201 of a lathe, bore drilling machine, or other fabricating device is moved laterally on a bed 202 by means of a feed screw 203 which is actuated by a feed motor 204. A detecting head 2 corresponding to the head 2 of FIG. 1 is fixed on the table 201. It possesses the photoelectric transducer 3 with the element 19 displaceable by the surrounding gear 16 as in FIG. 2. A scale 206 corresponding to scale 8 of FIG. 1 is mounted on the bed 202. It is magnified by a lens in head 2 and projected onto the element 19 as in FIG. 2.

Engaging the gear 16 is a gear 213, each of whose rotations through a predetermined angle excites a pulse generator 212 to emit a pulse to a reversible binary counter 218 through a comparator-polarity responsive reversible-select gate 217. A comparator 216 senses the difference in the contents of the counter 218 and a binary input register 215. The latter carries the value corresponding to the two decimal integers N6 and N7 of a decimal input panel 214. A servomotor 210 turns a spur gear 211 in response to the output of comparator 216 so as to rotate the gear 16 which meshes with gear 211 and thereby displaces the element 19 from the center of head 2 toward a position corresponding to the decimal digit input value N6, N7. The binary counter 218 is reversible, i.e. it can count up or down depending on the polarity of the pulses from the gate 217, which polarity is determined by the effect (polarity) of the output of comparator 216 upon gate 217. The above-described feedback loop is designated the first loop.

The second loop responds to the value set into the digit portion N1, N2, N3, N4, N5 of the decimal input panel 214. A decimal-binary conversion register 219 stores this value as a binary number and applies it to a comparator 220 for comparison with a second value from an up-or-down (reversible) binary counter 222. The comparator (220) output controls rotation of the feed motor 204 and hence lateral movement of the table 201 and detecting head 2 in a direction determined by the comparator output polarity. The transducer 3 responds to this motion each time a scale line of the image of the scale 206 passes the element 19 by emitting a pulse to the reversible binary counter 222 through a reversible select gate 221. The gate 221 determines whether the pulse value from the head 2 is to be added to or subtracted from the value in the counter 222. This is done by its connection from the comparator 220 on the basis of the direction of movement of the table 201 as determined by the polarity of the output from comparator 220.

Also sensing the output of the two comparators 216 and 220 is a compensator 223 for the binary counter 222.

In operation, the position of the head 2 and the element 19 may be at 0 on the scale 206 or at any other position to which they have been moved as a result of a previous operation, which other position is thus entered into the binary counters 218 and 222. The new-position input value is entered into the panel 214 as a seven digit decimal number composed of five number digits N1, N2, N3, N4, and N5 and two decimal (fractional) digits N6 and N7. The values of N1 to N5 are respectively in ten-thousands, thousands, hundreds, tens and units of millimeters. The values of N1 to N5 are respectively in ten-thousands, eters, respectively, and represent the vernier setting between the scale (206) graduations which are set 1 mm. apart. The decimal-to-binary conversion registers 219 and 215 convert the values N1, N2, N3, N4, N5 and N6, N7 to respective binary numbers and apply them to the comparators 216 and 220 which also receive the present position values from counters 218 and 222. The output and polarity of comparator 216 is determined by the relative value of the inputs and biases the reversible select gate 217. It also excites the servo-motor 210 to move the element 19 toward a point which is N6N7 millimeters on the low side of the center of head 2; that is, low relative to the projection of scale 206 thereon. (If element 19 is set to 0 it will move toward the position corresponding to —N6N7 off-center of head 2.) The change in position is registered in the binary counter 218 in the proper direction (up or down) by proper setting of gate 217 with the output of comparator 216. The binary counter 218 then changes the input to comparator 216 which stops drive motor 210 only when the values from the register 215 and the counter 218 are in agreement. At this time the element 19 is at the position N6N7 below the center of head 2.

The output from the comparator 220 then drives servo-motor 204 to move the table 201 and head 2 toward the scale line corresponding to N1N2N3N4N5 in the proper direction determined by the polarity of the output from comparator 220 and hence by the relative values from the register 219 and the counter 222. This polarity then biases the gate 221 so that entries into counter 222 are of the proper polarity to add or subtract from the value previously set therein.

As the head 2 moves with the table 201, the image of the individual scale lines on scale 206 are projected upon the element 19 for each 1 mm. of movement thereby causing an emission of an electrical pulse every 1 mm. These pulses are added to (or subtracted from) the previous value in the counter 222. The counter 222 changes the input to the comparator 220 which stops exciting the feed motor 204 when the counter 222 and the register 219 have equal values and the element 19 senses the scale line corresponding to N1, N2, N3, N4, N5 in value. Since the element 19 is offset by the value N6, N7 on the low side of the center of the head 2, said head will then be opposite the scale value N1, N2, N3, N4, N5, N6, N7. The table 201 will then be in the desired position.

If the table 201 started at a position N1', N2', N3', N4', N5', N6', N7'=N', for example N'=0, and is to be moved to the position 22389.63 the element 19 would first have to be moved to a point —.63. The head 2 and table 201 would then be moved until 22389 pulses had been emitted due to the element 19 sensing scale lines. However, the first pulse would be emitted due to the element 19 crossing the 0 line, and the 22389th pulse would be emittted after the element 19 reaches the 22388th line. The head 2 would then be opposite point 22388.63, causing an error of 1 mm.

Such errors occur only if N6N7 and N are simultaneously greater or less than N6'N7' and N'. The compensator 223 senses the output values of both comparators 216 and 220. If both have a positive output polarity indicating that N6N7 and N are greater than N6'N7' and N' respectively, then the compensator 223 adds —1 to the binary counter 222. Thus, one extra pulse will have to be added to the counter 222 by head 2 before comparator 220 balances and stops the table 201.

If both comparators 216 and 220 have negative output polarities the compensator 223 adds +1 to the binary counter 222. The head 2 need send one less pulse than before until the comparator 220 balances and stops the table 201. Opposite polarity signals from comparators 216 and 220 produce no compensator output.

The following table summarizes the operation of the compensator 223.

When N6N7>N6'N7'

If N>N' The compensator 223 adds —1
 If N<N' No compensation

When N6N7<N6'N7'

If N>N' No compensation
 If N<N' The compensator 223 adds +1.

We claim:
1. A digital system for controlling the position along a given path of a movable structure movably mounted on a fixed structure, comprising
 drive means coupled to said movable structure for displacing it;
 detector means mounted on said two structures for detecting positional variation of said movable structure along said path, said detector means comprising scale means affixed to one of said structures and an optical detecting element movably mounted on the other of said structures in operative proximity with said scale means;
 datum setting means having a first portion selectively adjustable for setting the major amount of a desired positional datum value and having a second portion selectively adjustable for setting the residual amount of said datus value;
 presetting control means coupled to said optical detecting element for moving said optical detecting element relative to said structure in accordance with said residual amount, said presetting control means comprising first register means having an output and a content equal to that of the second portion of said datum setting means, a servomotor coupled to said optical detecting element for moving said optical detecting element along said given path, a pulse generator coupled to said optical detecting element for providing pulses corresponding in number to the displacement of said optical detecting element, first counter means having an output and an input connected to said pulse generator for counting pulses generated by said pulse generator, first comparator means having an output connected to said servomotor, an input connected to the output of said first counter means and an input connected to the output of said first register means for comparing the contents of said first register means and said first counter means and for energizing said servo-motor until coincidence of the contents of said first register means and first counter means; and
 drive control means coupled to said drive means, said drive control means comprising second register means having an output and a content equal to that of the first portion of said datum setting means, second counter means having an output and an input connected to said detector means for counting pulses generated by said detector means, second comparator means having an output connected to said drive means, an input connected to the output of said second counter means and an input connected to the output of said second register means for comparing the contents of said second register means and said second counter means and for energizing said drive means until coincidence of the contents of said second register means and second counter means.

2. A digital system as claimed in claim 1, wherein said drive control means responds to the direction and magnitude of departure of said movable structure from a position corresponding to said datum value in a manner whereby said drive means displaces said movable structure to a position at which said movable structure corresponds to said datum value.

3. A digital system as claimed in claim 1 wherein each of said first and second counter means comprises a reversible counter.

4. A digital system as claimed in claim 1 wherein each of said first and second counter means comprises a reversible binary counter.

5. A digital system as claimed in claim 1, wherein said presetting control means comprises a first feedback loop and said drive control means comprises a second feedback loop.

6. A digital system as claimed in claim 1, wherein said presetting control means comprises a fine adjustment loop and said drive control means comprises a coarse adjustment loop.

7. A digital system as claimed in claim 1, further comprising compensating means having an output connected to an input of said second counter means, an input connected to the output of said first comparator means and an input connected to the output of said second comparator means for selectively varying the count of said second counter means in accordance with the comparaisons provided by said first and second comparator means.

References Cited

UNITED STATES PATENTS

| | | | |
|---|---|---|---|
| 2,710,934 | 6/1955 | Senn | 318—162 X |
| 2,785,353 | 3/1957 | Fenemore. | |
| 2,907,937 | 10/1959 | Apgar et al. | 318—28 |
| 3,020,460 | 2/1962 | Morin et al. | 318—28 |
| 3,068,386 | 12/1962 | Jaeger et al. | 318—28 |
| 3,142,018 | 7/1964 | Eisengrein | 318—28 |

ORIS L. RADER, *Primary Examiner.*

JOHN F. COUCH, *Examiner.*

T. LYNCH, *Assistant Examiner.*